(12) United States Patent  (10) Patent No.: US 8,930,992 B2
Sugiyama et al.  (45) Date of Patent: Jan. 6, 2015

(54) TV SOCIAL NETWORK ADVERTISING

(75) Inventors: Nobukazu Sugiyama, San Diego, CA (US); Marvin Paul DeMerchant, San Diego, CA (US); Aran London Sadja, San Diego, CA (US)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/353,469

(22) Filed: Jan. 19, 2012

(65) Prior Publication Data

US 2013/0191869 A1  Jul. 25, 2013

(51) Int. Cl.
  *H04N 7/10* (2006.01)
  *H04N 7/025* (2006.01)
(52) U.S. Cl.
  USPC .................... 725/35; 725/38; 725/42; 725/51
(58) Field of Classification Search
  USPC ...................................................... 725/32–36
  See application file for complete search history.

(56) References Cited

U.S. PATENT DOCUMENTS

| | | | |
|---|---|---|---|
| 6,177,931 B1 * | 1/2001 | Alexander et al. ............... | 725/52 |
| 6,670,971 B1 * | 12/2003 | Oral .............................. | 715/769 |
| 6,756,997 B1 | 6/2004 | Ward, III et al. | |
| 8,310,443 B1 | 11/2012 | Pan | |
| 8,671,424 B2 * | 3/2014 | Skinner .......................... | 725/32 |
| 2003/0208756 A1 | 11/2003 | Macrae et al. | |
| 2006/0271953 A1 | 11/2006 | Jacoby et al. | |
| 2008/0052742 A1 | 2/2008 | Kopf et al. | |
| 2008/0222295 A1 | 9/2008 | Robinson et al. | |
| 2008/0274687 A1 | 11/2008 | Roberts et al. | |
| 2008/0276269 A1 | 11/2008 | Miller et al. | |
| 2009/0007179 A1 | 1/2009 | Angiolillo et al. | |
| 2010/0185502 A1 | 7/2010 | Roberts et al. | |
| 2011/0119702 A1 | 5/2011 | Jang et al. | |
| 2011/0178854 A1 | 7/2011 | Sofer et al. | |
| 2012/0059696 A1 | 3/2012 | Theberge et al. | |
| 2012/0278428 A1 * | 11/2012 | Harrison et al. ............... | 709/217 |
| 2012/0278725 A1 * | 11/2012 | Gordon et al. ................ | 715/738 |
| 2013/0247096 A1 | 9/2013 | Miller et al. | |

FOREIGN PATENT DOCUMENTS

WO  2011062326 A1  5/2011

OTHER PUBLICATIONS

Extended European Search Report for EP application 13151298.0 dated Jan. 20, 2014.
European Office Action for corresponding European application 13 151 298.0—1905 dated Sep. 26, 2014.

* cited by examiner

*Primary Examiner* — Dominic D Saltarelli
(74) *Attorney, Agent, or Firm* — Miller Patent Services; Jerry A. Miller

(57) ABSTRACT

An advertising method involves displaying a plurality of social network thumbnails as an array of thumbnails on a television display, where said plurality of social network thumbnails represent social network videos that are posted or linked to a social network post; representing an advertisement as a thumbnail representation; displaying the advertisement thumbnail representation within the array of thumbnails on the television display; and receiving an instruction selecting of one of the thumbnails to navigate to and responsive thereto displaying either one of the social network videos or the advertisement. This abstract is not to be considered limiting, since other embodiments may deviate from the features described in this abstract.

31 Claims, 7 Drawing Sheets

TV SOCIAL NETWORK ADVERTISING

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Social Network Services (SNS) are growing rapidly with the main revenue of SNS being in advertisement. It is therefore advantageous from a revenue perspective to attract users to advertisements using SNS.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
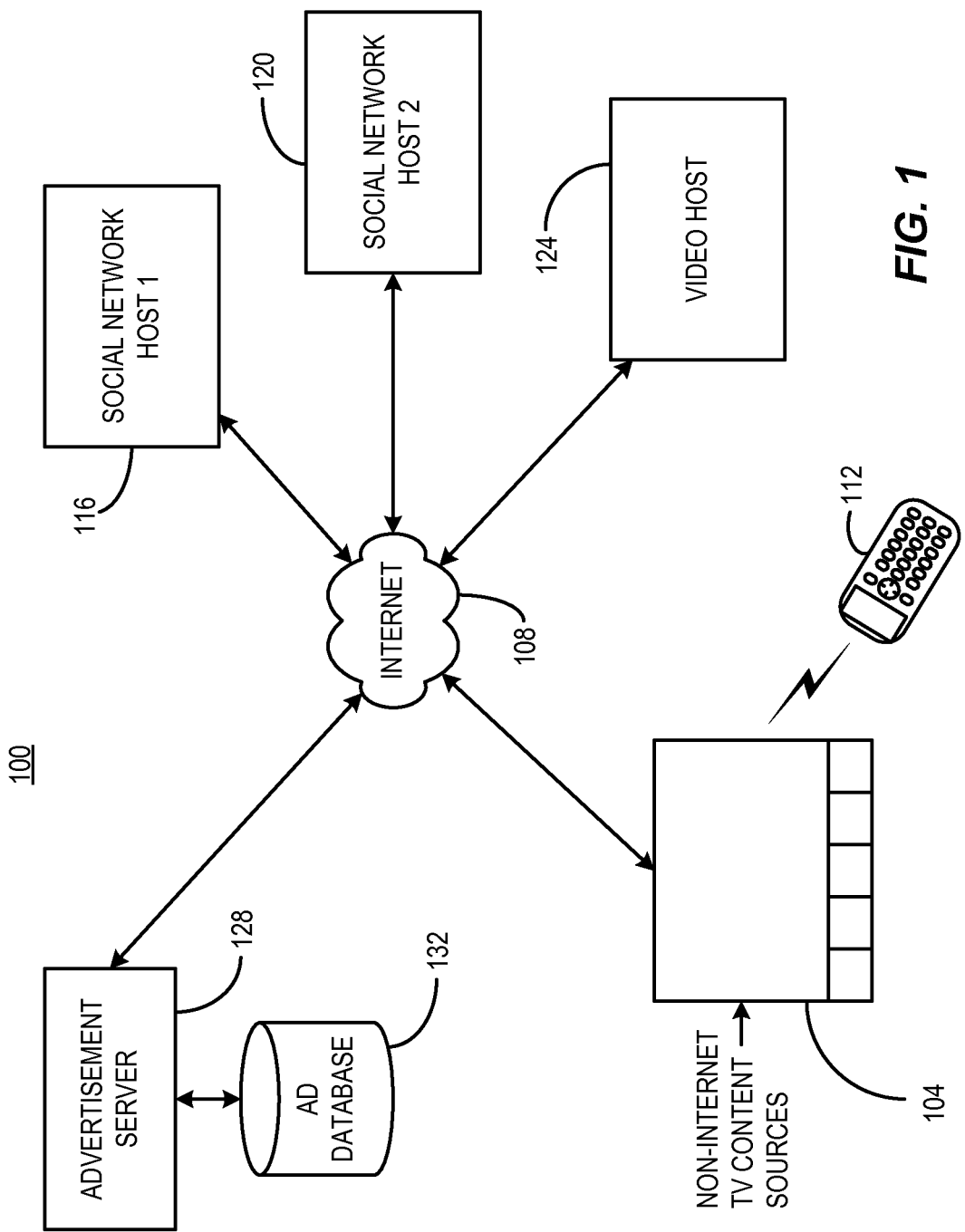
FIG. 1 is an example of a system for social network advertising consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. In this discussion, the use of the term "Program" is generally consistent with that of the MPEG-2 Systems standard (ISO/IEC 13818-1). An MPEG-2 Program has the associated Elementary Stream components, such as for example one video Elementary Stream and one or more audio Elementary Streams. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

For purposes of this document, the term "video" is used to broadly encompass both moving pictures such as audio/video clips and silent moving video clips and collections thereof as well as still images and albums/collections of still images. Additionally, the term is utilized to refer to mixed media content.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Social Network Services (SNS) are growing rapidly with the main revenue of SNS being in advertisement. On TVs, in order to attract users to advertisements (ads), in accord with certain implementations consistent with the present invention, thumbnails of ads can be shown next to other contents. These ads are pulled from ad servers, which may or may not use user profiles or other data stored on a particular TV.

In accord with certain implementations, contents can be retrieved from social networks such as Facebook™ and/or Twitter™ or any other suitable social network which includes a link to a video, picture, photo album, web site or other content such as a YouTube™ link. In this implementation, thumbnail representations of the contents are retrieved and displayed from, e.g., the YouTube link with a profile picture and comment. Such display, for example may be implemented by a sequence of thumbnails appearing at the bottom portion of the display with the sequence scrolling, for example from left to right, somewhat like a slow ticker tape with a new thumbnail from the left shifting all displayed thumbnails to the right and dropping the rightmost thumbnail in the process as the scrolling occurs. Periodically, e.g., every four (4) thumbnails, or randomly (or pseudo-randomly which is considered equivalent for purposes of this discussion) the system can retrieve an advertisement and display a thumbnail in the sequence representing the advertisement. This number, whether fixed or random is referred to herein as the "ad value" meaning a number of thumbnails that is reached in order to trigger retrieval and display of an advertisement. Once the user selects a thumbnail of an advertisement, a browser or video player can be launched as appropriate to display the advertisement's contents.

Turning now to FIG. 1, a system 100 consistent with certain implementations of embodiments of the present invention is depicted. In this illustration a television set 104 receives content from any of one or more non-Internet sources of content as well as having a connection to the Internet 108. The user exercises control over the operation of the television by a user interface such as that provided in a remote controller (RC) 112 via wireless infrared (IR) and/or radio frequency (RF) communication. While the present implementation depicts current implementations embedded within the television (TV), implementations may also be done utilizing so-called set top boxes (STB) or other television receiver devices without limitation.

In accord with the currently depicted implementation, the TV 104 is able to utilize a network interface (wireless or wired) to access the Internet 108. Thus, by appropriate programming of a processor within the TV 104 or otherwise configuring or hardwiring the TV 104, the TV 104 can retrieve content from one or more social networks via social network hosts 116 and 120 (two shown by way of example) which might represent, for example, Facebook™ and/or Twitter™ or any other current or future social network that the user may wish to participate in. Those social networks may provide a mechanism for access to various video content (including moving and still video content) via, for example, either local storage at the social network hosts 116 and 120 directly or via a link to a post to a video host such as 124 (e.g. YouTube™ or another web site). Similarly, the TV 104 can contact one or more advertisement servers such as 128 that stores a database of advertisements 132 that can be retrieved at random, based upon contractual relationships with the advertisers, and/or based upon a user profile stored at the TV or the social network web sites or a combination thereof. It is further noted that multiple ads and/or ad thumbnails could be downloaded to the TV on request or by design for local storage at the TV for retrieval and display as will be described.

Figure 2:
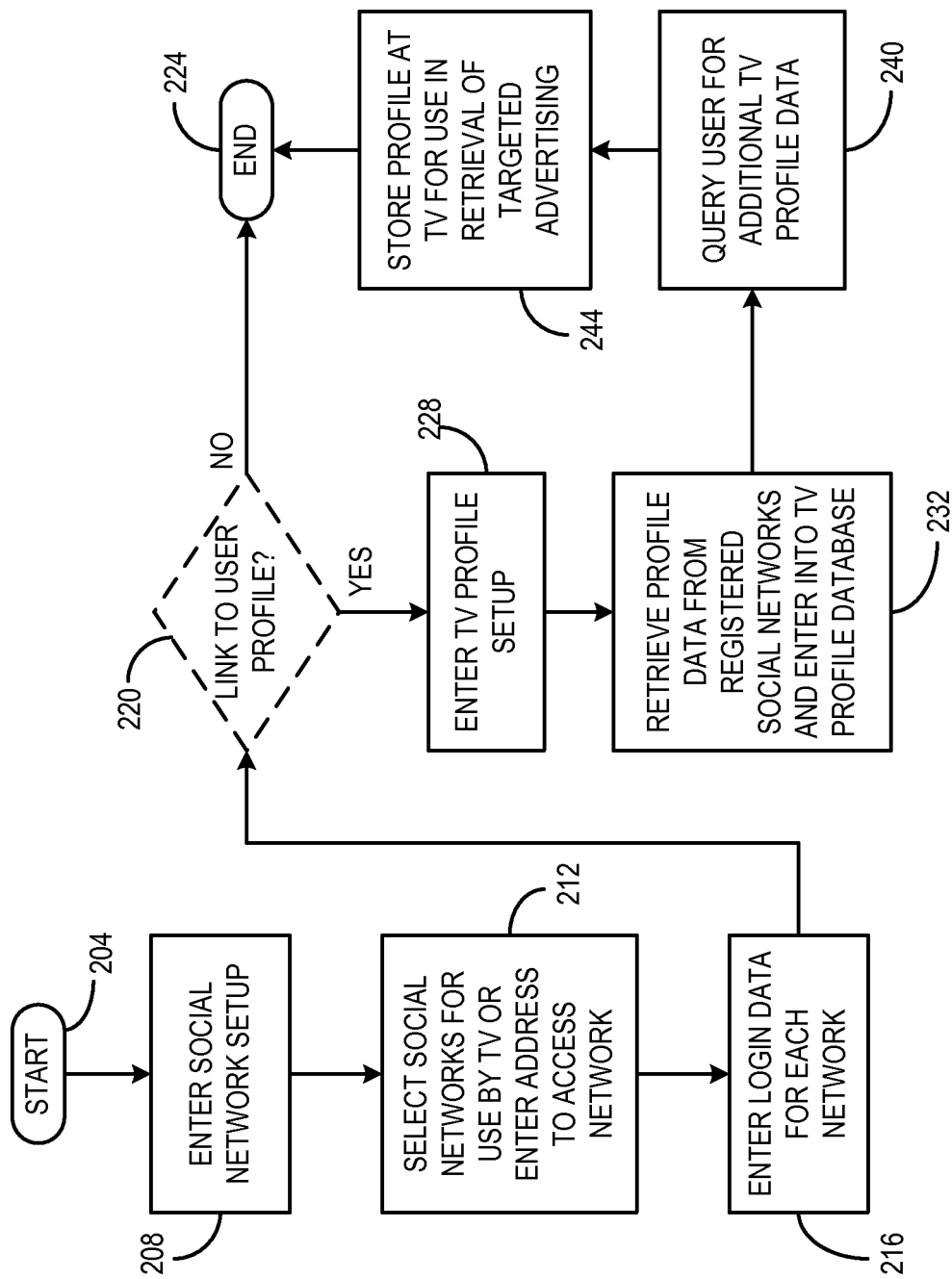
FIG. 2 is an example of a TV setup process consistent with certain embodiments of the present invention.

Turning now to FIG. 2, a process 200 for setup of social networks according to an implementation consistent with embodiments of the present invention is depicted starting at 204 after which the user enters a social network setup module at 208. This module may form part of an initialization process for setup of the TV and/or may be entered for modification from time to time from any suitable menu system. After entering this module, the user may select social network services which he or she desires for the TV to access. This can be accomplished in any number of ways including selection from a list provided in a menu or typing in an actual address for locating the social network on the Internet or some combination thereof at 212. Once the networks are established, the TV can be provided with login data (user name, passwords, etc.) as desired at 216. It is noted that 216 and 218 can be carried out as an iterative process one network at a time until the user has defined all of the social networks desired.

In certain implementations, it may be desirable to establish a link to a user's profile for purposes of obtaining a degree of targeting of advertisements that will be delivered or made available to the user. In certain implementations, this may be an option available to the user at 220, which if the user passes the option up, the process ends at 224. The optional nature of this decision is denoted by the dashed lines used in decision block 224. However, if the user wishes only to receive advertisements that may be of interest, the TV can establish a profile using the user profile data from the social networks as well as manual entry thereof by entering a TV profile setup module at 228. In this case, profile data may be retrieved from the registered social networks at 232 as well as query of the user for other relevant profile data at 240. Additionally, as the user operates the TV, the TV may be programmed to mine additional profile data based on viewing preferences and the like. At 244, the profile is stored at the TV for use in retrieval of advertisements and ad thumbnails as will be described later.

Figure 3:
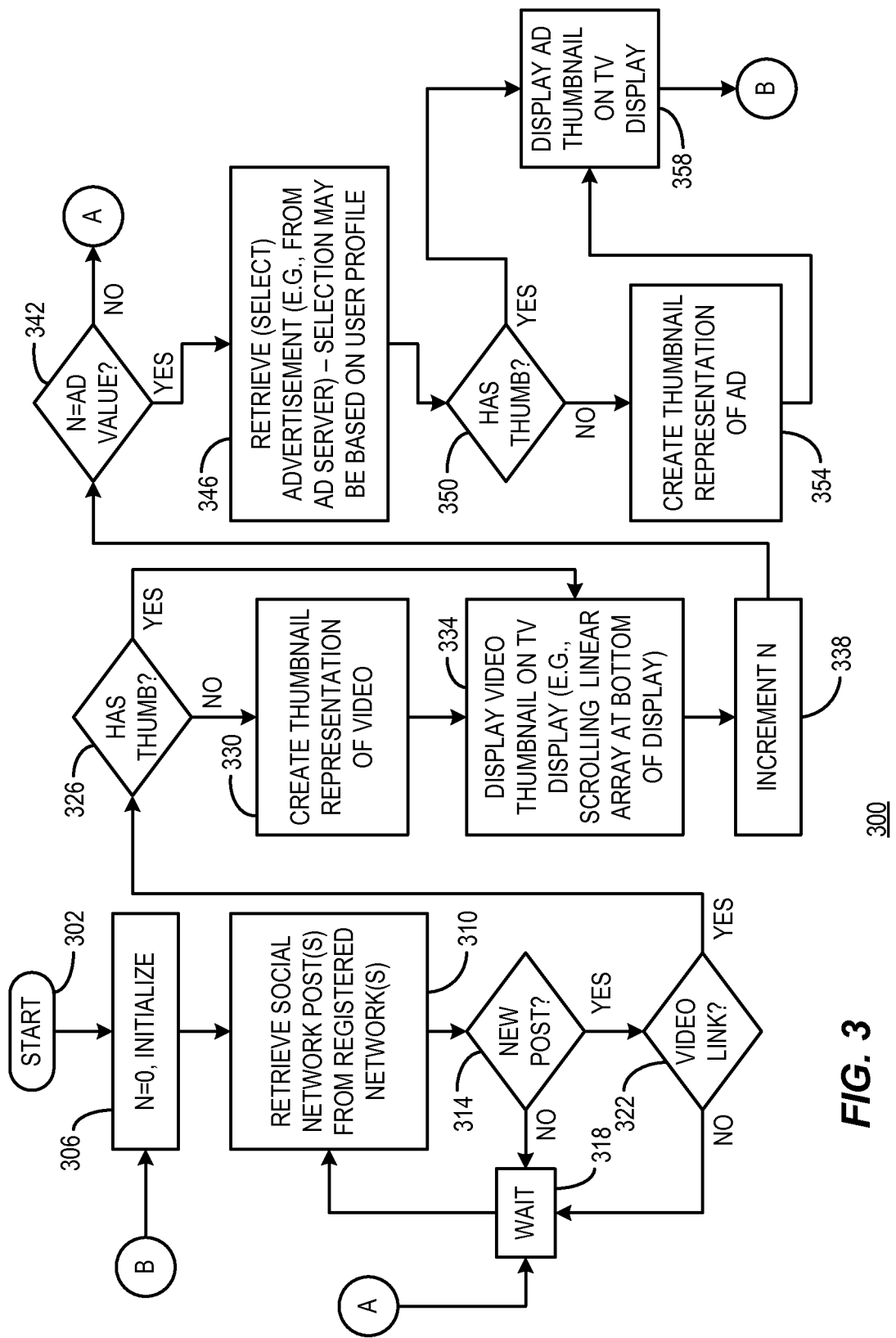
FIG. 3 is an example of a process for operation of a television receiver device in a manner consistent with certain embodiments of the present invention.

With reference to FIG. 3, an example process for operation of a system in a manner consistent with certain implementations is depicted as process 300 starting at 302. At 306, the process is initialized with an integer number N set to 0, indicating that there are currently no thumbnails displayed on the TV display. The process then proceeds to 310 where the TV determines if there is a new social network post from one or more of the registered social networks. If no new post is found at 314, the process waits for a prescribed wait time at 318 and then returns to 310 to look again for new posts. If a new post is found among the social networks (generally post by members of the network to which the user belongs) at 314, then the TV processor determines if the post contains a video link at 322. If not, the process returns to 318 and then to 310 to continue until a video link is found at 322.

Once a video link is found at 322, e.g., by virtue of a post such as a Facebook or Twitter posting having an attached link to YouTube, then the process proceeds to 326 to determine if the video link has a thumbnail or not. If not, the TV selects an image from the link to use as a thumbnail at 330 or otherwise constructs a thumbnail and the process proceeds to 334. If so, the process proceeds directly to 334, skipping 330. At 334, the thumbnail is displayed to provide the user with information that can be used to retrieve the video. That is, the thumbnail can be selected by the user via a remote control to navigate to the video. The thumbnail also preferably has an indicator of the social network and who posted the video. Since a video link has been identified, the counter increments N by one at 338. Control then passes to 342 where the value of N is inspected.

An "Ad Value" as defined above, is a fixed or random integer number that is used to determine whether or not to insert an advertisement. Once the value of N has been incremented, the value of N is inspected to see if an advertisement should be inserted. It is desirable for such ad insertion to not be too intrusive upon the user's experience, but also to provide an effective advertising mechanism. For this example, assume that ever fourth thumbnail is to be an advertisement, however, this number need not be fixed but could be random and/or could be constrained to, for example, every three to six or four to ten thumbnails. In this case, if the value of N reaches the Ad Value, the TV processor retrieves or selects an advertisement either from local storage or from a remote ad server on the Internet at 346. This selection may be based upon a query of the available advertisements for ads that meet one or more search criteria based upon the user's stored profile as previously discussed, or may be purely or partly based upon contractual arrangements with advertisers.

Once the advertisement has been selected, it may be inspected to see if it has an associated thumbnail at 350. If so, the thumbnail is displayed on the TV display at 358. If not, a thumbnail can be created at 354 for display on the TV at 358.

Figure 4:
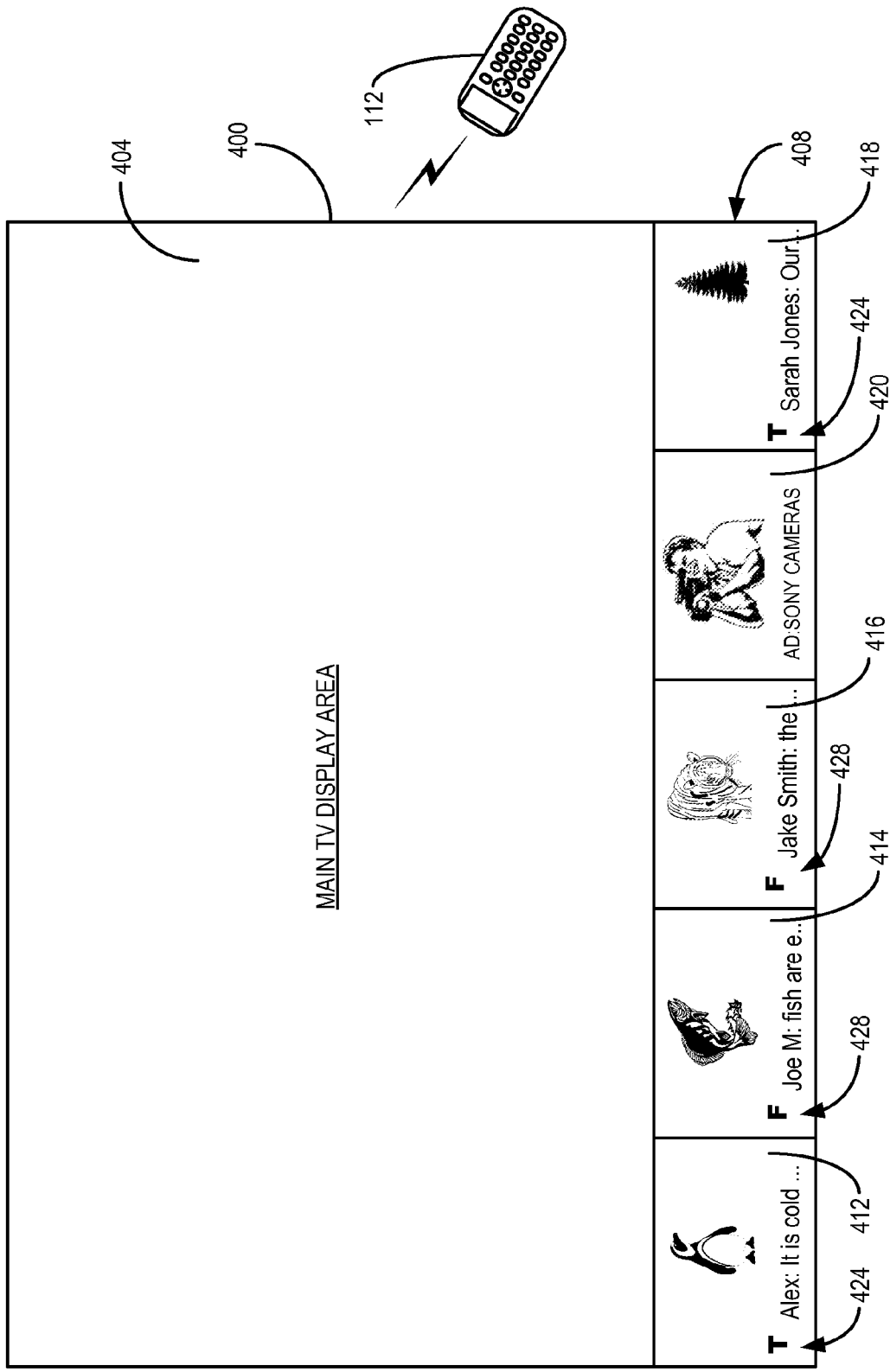
FIG. 4 is an example of a TV display layout with video thumbnails for advertisements consistent with certain embodiments of the present invention.

Once this process has iterated several times, a TV display image 400 resembling that of FIG. 4 is available. In this example, the TV display 400 includes a main display or main viewing area 404 representing a predominant portion of the display area and which may be simultaneously displaying a TV program or other video content. The user can navigate about the display using the remote controller 112. In this example, a linear array 408 of thumbnail images is provided at the lower portion of the display area. These thumbnails can be provided as an overlay to the main TV display thereby obscuring it, or may be somewhat transparent permitting viewing through the thumbnails. The array of thumbnails as depicted has a plurality of thumbnails representing videos retrieved from social media such as thumbnails 412, 414, 416 and 418. Thumbnail 420 represents an advertisement thumbnail that has been inserted into the array. As a new thumbnail is available, the array may shift to the right, for example, revealing the newest thumbnail on the left and dropping off the oldest thumbnail on the right. In certain implementations, the user may be able to retrieve older thumbnails remaining in a queue by use of a scrolling control from RC 112.

It is desirable for the viewer to be able to identify the origin of the video posts to the social network, and also to distinguish such posts from advertising. In one example, this is accomplished by use of a logo of the social network such as those shown as 424 and 428 which might represent a trademark of the social network or other indicator. The thumbnail should also preferably incorporate text to identify the poster such as the poster's name and a portion of the related post text (which can be displayed in full if selected by the user).

Figure 5:
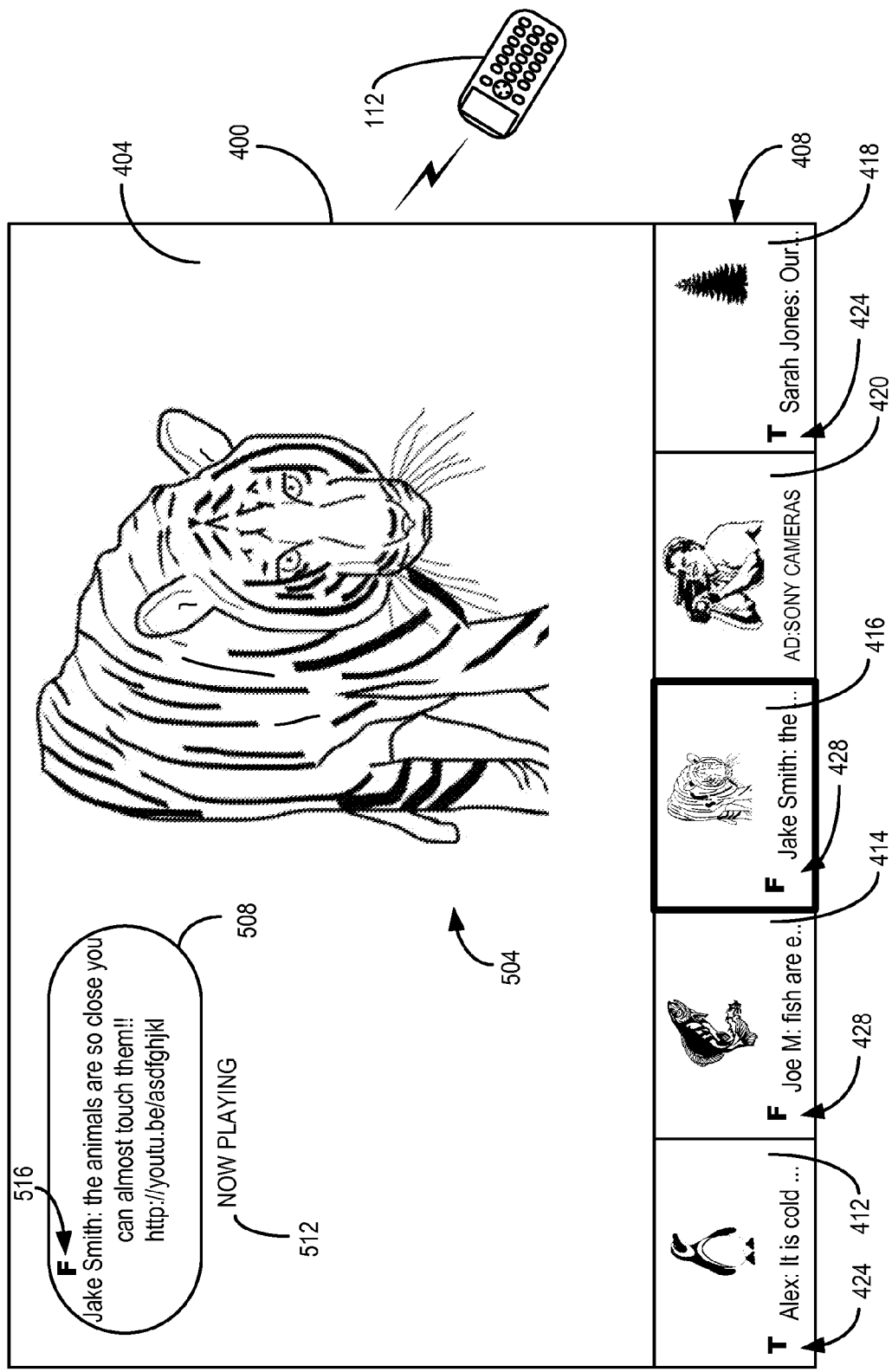
FIG. 5 is an example of a TV display displaying a social network video in a manner consistent with certain embodiments of the present invention.

When the user selects a post for playback, it is appropriately scaled and possibly up-converted for suitable display on the present TV display and the video is played as shown in FIG. 5 at 504. The full text post is preferably also displayed on the main display at 508 along with an indication that this video is currently playing at 512 and the social media source of the post at 516. In this example, the video being played is also indicated by highlighting of the post in the sequence of thumbnails at the bottom of the display.

Figure 6:
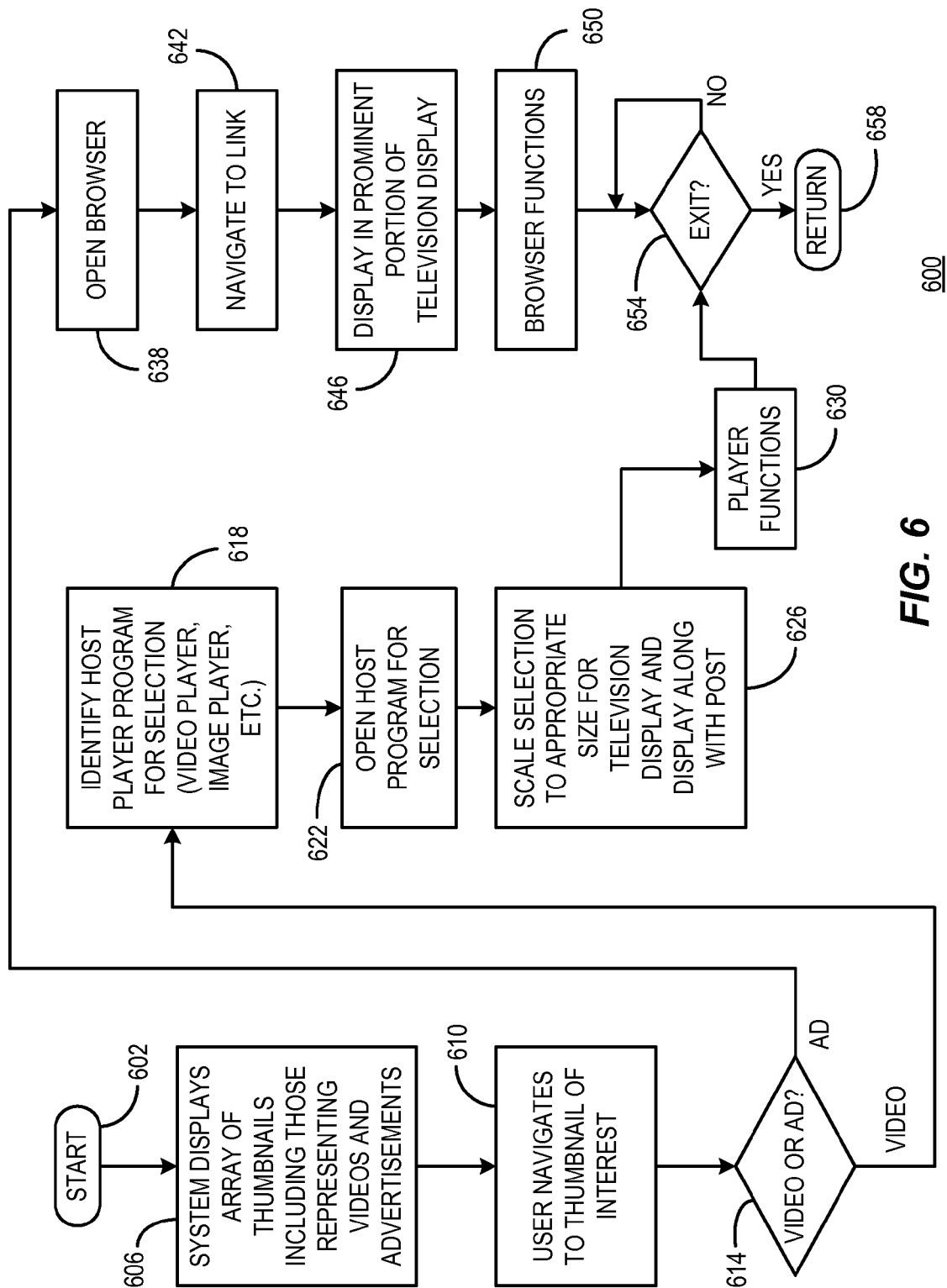
FIG. 6 is an example of a process for operation of a system consistent with certain embodiments of the present invention.

The operational process described above is depicted in FIG. 6 as process 600 in flow chart form starting at 602. At 606, the TV system displays an array of thumbnails 408 at a suitable display location such as the bottom of the display, where such thumbnails represent videos as well as advertisements. At 610, a user can navigate to a desired thumbnail of interest using the remote controller or other suitable interface and then makes a selection. This results in a signal to be sent to the processor that results in navigation to the thumbnail selection. Once the selection is made, the TV system determines if the selection is a video or a link to an advertisement at 614. Generally speaking, it may be more preferable to play videos using a video player module, but it is possible to play such videos in a browser. For purposes of this example, however, it is desirable to identify a host player that can play the video format of the video file at 618 and then open that host player program at 622. The video can then be appropriately scaled in one implementation for playback on the display of the TV taking the display size into consideration. This may include up-conversion. The video is then played along with display of the associated social media post in full and an indication of the social network from which the post originated at 626. Once the video is playing, the user can access the player's normal functions at 630 and control play of the video in a conventional manner. Once the user chooses to exit at 654, the program returns at 658 to the start to await selection of a new video.

In the event that the user selects an advertisement at 614, a browser is generally opened to navigate to a web site containing the ad. However, it is noted that the ad could be stored as a video locally or at an ad server and thus played back by a video player. In this implementation, however, the browser is opened at 638 and the browser navigates to the advertisement link at 642. The ad is then displayed in the main or prominent portion of the display at 646 at which point the user can utilize conventional browser functions at 650 until such time as the user chooses to exit at 654 and the process returns at 658.

It is noted that the example 600 presumes that the social media video is in the form of a video file link, while the advertisement is in the form of a Universal Resource Locator (URL) or other link, but this is not necessarily the case. For example, it is generally the case at this writing that a Twitter "tweet" will generally include a URL link to a video. Those skilled in the art will appreciate that it is the link to the content, be it advertisement content or web address, will determine what host software needs to be loaded in order to enable the user to view the video or ad content. Hence, the illustrated process is presented only by way of illustration and not by way of limitation. Analysis of the link itself is generally enough to determine how to run the ad or video.

Figure 7:
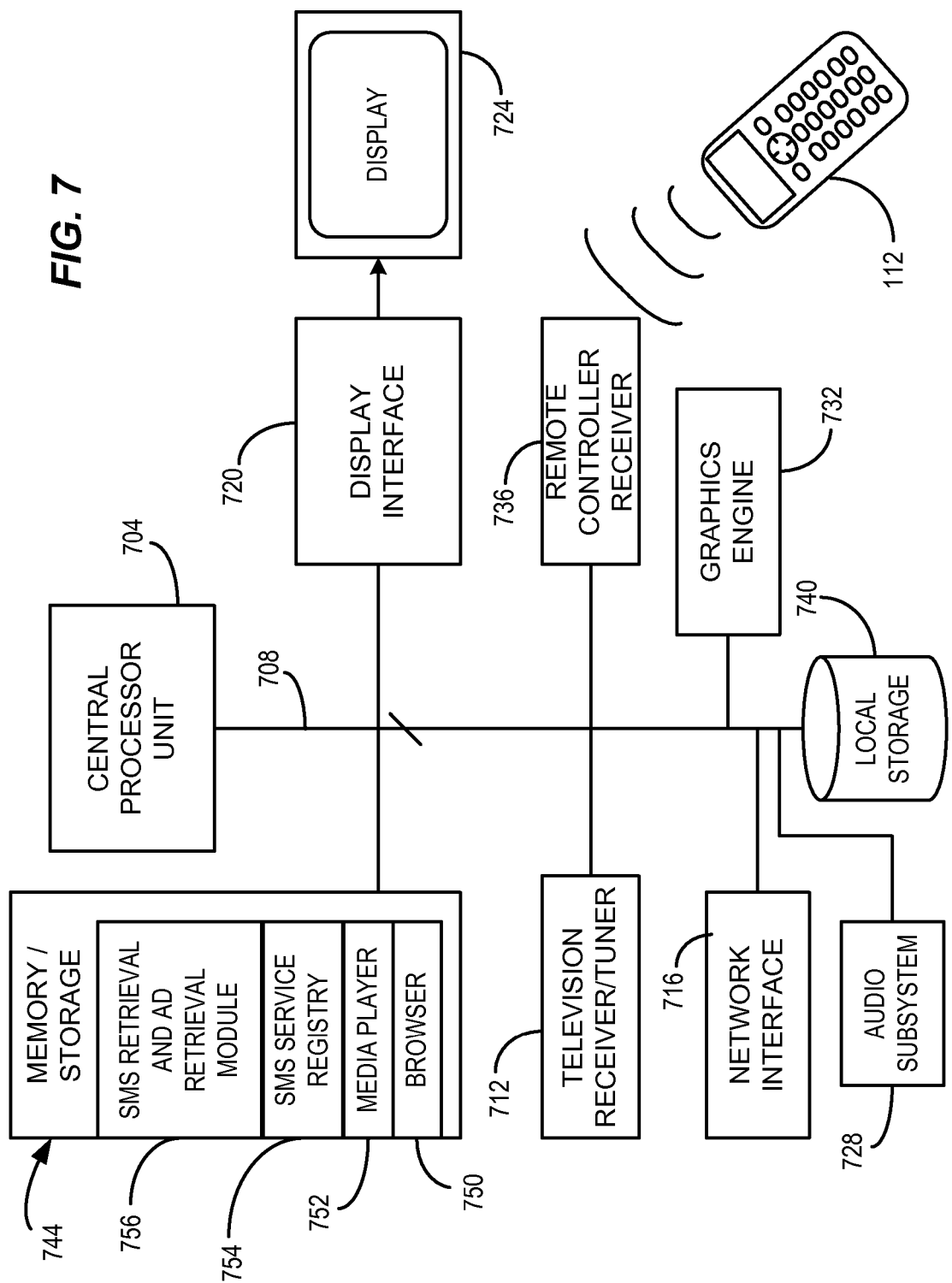
FIG. 7 is an example of a TV receiver device consistent with certain embodiments of the present invention.

Referring to FIG. 7, it is noted that a modern digital television set 700 generally operates under control of one or more programmed processors. Accordingly, TV 700 incorporates one or more processors 704 coupled with other television hardware via one or more communication buses 708. The TV 700 includes a television receiver/tuner 712 operating under control of the processor 704. The processor also controls operation of a network interface 716 that is used to connect wirelessly or wired to the Internet. Decoded video is passed to a video interface 720 to display (e.g., an LED or LCD display) 724. Audio is decoded and processed at an audio subsystem 728. A graphics engine 732 renders graphic content such as electronic program guide data and may be used in processing graphics overlays for display of social media posting or rendering of graphics and other content displayed in accord with implementations consistent with the present invention. A remote controller receiver 736 receives commands from the RC 112 serving as an input device for the user interface. Local storage 740 such as disc drive storage or flash memory may be used to store thumbnails and video content.

A memory 744 that can be made up of any suitable type of storage device can be used as operating memory for processor 704 including program modules (arranged in any suitable operational configuration) such as a browser 750, media player 752, social media registry storage 754, program modules for retrieval of ads and social media videos 756 as described as well as other functions including but not limited to TV functions, random number generator module, registration functions, data mining functions, profile storage and refinement, and other programmed functions.

Thus, an advertising method consistent with the present teachings can involve displaying a plurality of social network thumbnails as an array of thumbnails on a television display, where the plurality of social network thumbnails represent social network videos that are posted or linked to a social network post; representing an advertisement as a thumbnail representation; displaying the advertisement thumbnail representation within the array of thumbnails on the television display; and receiving an instruction selecting of one of the thumbnails to navigate to and responsive thereto displaying either one of the social network videos or the advertisement.

In certain implementations, the advertisement comprises one of a video and a link to a web site. In certain implementations, displaying the advertisement thumbnail involves displaying one advertisement thumbnail for every N social network thumbnails, where N is a predetermined integer; or displaying the advertisement thumbnail involves displaying one advertisement thumbnail for every N social network thumbnails, where N is a random or pseudo-random integer. In certain implementations, displaying the video or the advertisement involves launching a browser module or displaying the video or the advertisement involves launching a video player module. In certain implementations the process further involves selecting the advertisement and retrieving the advertisement from an advertisement server via the Internet. In certain implementations, the advertisement is selected based on a user profile. In certain implementations, displaying the social network video further comprises displaying an associated social media post to which the social media video was linked and displaying a social network identifier.

Another advertising method involves retrieving a plurality of social network posts; determining which of the retrieved social network posts include a video or a link to a video; displaying a plurality of social network thumbnails as an array of thumbnails on a television display, where the plurality of social network thumbnails represent social network videos that are posted or linked to a social network post; selecting and retrieving an advertisement from an advertisement server via the Internet; representing the advertisement as a thumbnail representation; displaying the advertisement thumbnail representation within the array of thumbnails on the television display; where the displaying the advertisement thumbnail comprises displaying one advertisement thumbnail for every N social network thumbnails, where N is an integer; and receiving an instruction selecting of one of the thumbnails to navigate to and responsive thereto displaying either one of the social network videos or the advertisement.

In certain implementations, the advertisement is one of a video and a link to a web site. In certain implementations, displaying the advertisement thumbnail involves displaying one advertisement thumbnail for every N social network thumbnails, where N is one of a predetermined integer and a random or pseudo-random integer. In certain implementations, displaying the video or the advertisement involves launching a browser module or a video player module. In certain implementations, the advertisement is selected based on a user profile. In certain implementations, displaying the social network video further involves displaying an associated social media post to which the social media video was linked and displaying a social network identifier.

Another advertising method involves retrieving a plurality of social network posts; determining which of the retrieved social network posts include a video or a link to a video; displaying a plurality of social network thumbnails as an array of thumbnails on a television display, where the plurality of social network thumbnails represent social network videos that are posted or linked to a social network post; selecting and retrieving an advertisement from an advertisement server via the Internet; representing the advertisement as a thumbnail representation; displaying the advertisement thumbnail representation within the array of thumbnails on the television display, where displaying the social network video further comprises displaying an associated social media post to which the social media video was linked and displaying a social network identifier, and where displaying the advertisement thumbnail comprises displaying one advertisement thumbnail for every N social network thumbnails, where N is one of a predetermined integer and a random or pseudo-random integer; and receiving an instruction selecting of one of the thumbnails to navigate to and responsive thereto displaying either one of the social network videos or the advertisement.

In certain implementations, where displaying the video or the advertisement involves launching a browser module or a video player module. In certain implementations, the advertisement is selected based on a user profile.

A computer readable storage device such as a non-transitory storage device can store instructions which, when executed on one or more programmed processors, carry out any of the above methods.

A television receiver device adapted to display content on a display consistent with certain implementations has a television receiver and one or more programmed processors programmed to: display a plurality of social network thumbnails as an array of thumbnails on the television display, where the plurality of social network thumbnails represent social network videos that are posted or linked to a social network post; represent an advertisement as a thumbnail representation; display the advertisement thumbnail representation within the array of thumbnails on the television display; and receive an instruction selecting of one of the thumbnails to navigate to and responsive thereto displaying either one of the social network videos or the advertisement.

In certain implementations, the advertisement comprises one of a video and a link to a web site. In certain implementations, displaying the advertisement thumbnail involves displaying one advertisement thumbnail for every N social network thumbnails, where N is a predetermined integer. In certain implementations, displaying the advertisement thumbnail involves displaying one advertisement thumbnail for every N social network thumbnails, where N is a random or pseudo-random integer. In certain implementations, displaying the video or the advertisement involves launching a browser module. In certain implementations, displaying the video or the advertisement involves launching a video player module. In certain implementations, the processor is further programmed to select the advertisement and retrieve the advertisement from an advertisement server via the Internet.

In certain implementations, the advertisement is selected based on a user profile. In certain implementations, displaying the social network video further involves displaying an associated social media post to which the social media video was linked and displaying a social network identifier. In certain implementations, the television receiver device includes a display.

A television receiver device consistent with certain implementations has a television receiver and a television display. One or more programmed processors are programmed to: retrieve a plurality of social network posts; determine which of the retrieved social network posts include a video or a link to a video; display a plurality of social network thumbnails as an array of thumbnails on a television display, where the plurality of social network thumbnails represent social network videos that are posted or linked to a social network post; select and retrieving an advertisement from an advertisement server via the Internet; and represent the advertisement as a thumbnail representation; display the advertisement thumbnail representation within the array of thumbnails on the television display. Displaying the advertisement thumbnail can involve displaying one advertisement thumbnail for every N social network thumbnails, where N is an integer. The processor is further programmed to receive an instruction selecting of one of the thumbnails to navigate to and responsive thereto displaying either one of the social network videos or the advertisement.

In certain implementations, the advertisement comprises one of a video and a link to a web site. In certain implementations, displaying the advertisement thumbnail involves displaying one advertisement thumbnail for every N social network thumbnails, where N is one of a predetermined integer and a random or pseudo-random integer. In certain implementations, displaying the video or the advertisement involves launching a browser module or a video player module. In certain implementations, the advertisement is selected based on a user profile. In certain implementations, displaying the social network video further involves displaying an associated social media post to which the social media video was linked and displaying a social network identifier.

Those skilled in the art will recognize, upon consideration of the above teachings, that certain of the above exemplary embodiments are based upon use of one or more programmed processors programmed with a suitable computer program. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processor executing programming instructions that are broadly described above in flow chart form that can be stored on any suitable electronic or computer readable storage medium such as non-transitory storage media (meaning storage media that excludes only transitory propagating signals, but not storage media that can be rewritten or that loses information upon loss of bias or power). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. An advertising method, comprising:
    displaying a television program on a video display;
    retrieving a plurality of social network posts from one or more social networks identified by storage in a television receiver device's social media registry;
    displaying a plurality of social network thumbnails as an array of thumbnails overlaying the television program on the video display, where said plurality of social network thumbnails represent social network videos that are received in the plurality of social media posts or which are linked to social network posts;
    using an advertisement retrieval program of the television receiver device to select an advertisement from an advertisement server;
    representing the selected advertisement as a thumbnail representation;
    displaying the advertisement thumbnail representation within the array of thumbnails on the video display;
    where displaying the advertisement thumbnail comprises displaying one advertisement thumbnail for every AD VALUE social network thumbnails, where AD VALUE is an integer that changes randomly or pseudo-randomly within a predefined range; and
    receiving an instruction selecting one of the thumbnails to navigate to and responsive thereto displaying either one of the social network videos or the advertisement.

2. The method according to claim 1, where the advertisement comprises one of a video and a link to a web site.

3. The method according to claim 1, where displaying the video or the advertisement comprises launching a browser module responsive to receiving the instruction selecting one of the thumbnails.

4. The method according to claim 1, where displaying the video or the advertisement comprises launching a video player module responsive to receiving the instruction selecting one of the thumbnails.

5. The method according to claim 1, where retrieving the advertisement from the advertisement server comprises retrieving the advertisement via the Internet.

6. The method according to claim 1, where the advertisement is selected based on a user profile.

7. The method according to claim 1, where displaying the social network video further comprises displaying an associated social media post to which the social media video was linked and displaying a social network identifier.

8. A computer readable storage device storing instructions which, when executed on one or more programmed processors, carry out a method comprising:
    displaying a television program on a video display;
    retrieving a plurality of social network posts from one or more social networks identified by storage in a television receiver device's social media registry;
    displaying a plurality of social network thumbnails as an array of thumbnails overlaying the television program on the video display, where said plurality of social network thumbnails represent social network videos that are received in the plurality of social media posts or which are linked to social network posts;
    using an advertisement retrieval program of the television receiver device to select an advertisement from an advertisement server;
    representing the selected advertisement as a thumbnail representation;
    displaying the advertisement thumbnail representation within the array of thumbnails on the video display;
    where displaying the advertisement thumbnail comprises displaying one advertisement thumbnail for every AD VALUE social network thumbnails, where AD VALUE is an integer that changes randomly or pseudo-randomly within a predefined range; and
    receiving an instruction selecting one of the thumbnails to navigate to and responsive thereto displaying either one of the social network videos or the advertisement.

9. An advertising method, comprising:
    displaying a television program on a video display;
    retrieving a plurality of social network posts from one or more social networks identified by storage in a television receiver device's social media registry;
    determining which of the retrieved social network posts include a video or a link to a video;

displaying a plurality of social network thumbnails as an array of thumbnails on the video display, where said plurality of social network thumbnails represent social network videos that are retrieved in the plurality of social media posts or which are posted or linked to social network posts;
using an advertisement retrieval program of the television receiver device to select an advertisement from an advertisement server via the Internet;
representing the advertisement as a thumbnail representation;
displaying the advertisement thumbnail representation within the array of thumbnails overlaying the television program on the video display;
where displaying the advertisement thumbnail comprises displaying one advertisement thumbnail for every AD VALUE social network thumbnails;
where AD VALUE is an integer that changes randomly or pseudo-randomly within a predefined range; and
receiving an instruction selecting of one of the thumbnails to navigate to and responsive thereto displaying either one of the social network videos or the advertisement.

10. The method according to claim 9, where the advertisement comprises one of a video and a link to a web site.

11. The method according to claim 9, where displaying the video or the advertisement comprises launching a browser module or a video player module responsive to receiving the instruction selecting one of the thumbnails.

12. The method according to claim 9, where the advertisement is selected based on a user profile.

13. The method according to claim 9, where displaying the social network video further comprises displaying an associated social media post to which the social media video was linked and displaying a social network identifier.

14. An advertising method, comprising:
displaying a television program on a video display;
retrieving a plurality of social network posts from one or more social networks identified by storage in a television receiver device's social media registry;
determining which of the retrieved social network posts include a video or a link to a video;
displaying a plurality of social network thumbnails as an array of thumbnails overlaying the television program on the video display, where said plurality of social network thumbnails represent social network videos that are retrieved in the plurality of social media posts or which are posted or linked to social network posts;
using an advertisement retrieval program of the television receiver device to select an advertisement from an advertisement server via the Internet;
representing the advertisement as a thumbnail representation;
displaying the advertisement thumbnail representation within the array of thumbnails on the video display, where displaying the social network video further comprises displaying an associated social media post to which the social media video is linked and displaying a social network identifier, and where displaying the advertisement thumbnail comprises displaying one advertisement thumbnail for every AD VALUE social network thumbnails, where AD VALUE is an integer that changes randomly or pseudo-randomly within a predefined range; and
receiving an instruction selecting of one of the thumbnails to navigate to and responsive thereto displaying either one of the social network videos or the advertisement.

15. The method according to claim 14, where displaying the video or the advertisement comprises launching a browser module or a video player module responsive to receiving the instruction selecting one of the thumbnails.

16. The method according to claim 14, where the advertisement is selected based on a user profile.

17. A device adapted to display content on a display, comprising:
a television receiver device configured to display a television program on a video display;
a memory storing a social media registry;
one or more programmed processors programmed to:
retrieve a plurality of social network posts from one or more social networks identified by storage in the television receiver device's social media registry;
display a plurality of social network thumbnails as an array of thumbnails overlaying a television program displayed on the video display, where said plurality of social network thumbnails represent social network videos that are retrieved in the plurality of social media posts or which are posted or linked to a social network post;
use an advertisement retrieval program to select an advertisement from an advertisement server via the Internet;
represent an advertisement as a thumbnail representation;
display the advertisement thumbnail representation within the array of thumbnails on the display;
where displaying the advertisement thumbnail comprises displaying one advertisement thumbnail for every AD VALUE social network thumbnails, where AD VALUE is an integer that changes randomly or pseudo-randomly within a predefined range; and
receive an instruction selecting of one of the thumbnails to navigate to and responsive thereto display either one of the social network videos or the advertisement.

18. The device according to claim 17, where the advertisement comprises one of a video and a link to a web site.

19. The device according to claim 17, where displaying the video or the advertisement comprises launching a browser module responsive to receipt of the instruction selecting one of the thumbnails.

20. The device according to claim 17, where displaying the video or the advertisement comprises launching a video player module responsive to receipt of the instruction selecting one of the thumbnails.

21. The device according to claim 17, where the processor is further programmed to select the advertisement and retrieve the advertisement from an advertisement server via the Internet based upon a user profile stored at the television receiver device.

22. The device according to claim 17, where the advertisement is selected based on a user profile stored at the television receiver device.

23. The device according to claim 17, where displaying the social network video further comprises displaying an associated social media post to which the social media video was linked overlaying a portion of the television program and displaying a social network identifier.

24. The television receiver device according to claim 17, further comprising the display.

25. A device, comprising:
a television receiver device configured to receive television programs;

a television display coupled to the television receiver device and configured to display the television programs;

a memory storing a social media registry;

one or more programmed processors programmed to:

retrieve a plurality of social network posts from one or more social networks identified by storage in the television receiver device's social media registry;

determine which of the retrieved social network posts include a video or a link to a video;

display a plurality of social network thumbnails as an array of thumbnails overlaying the program on the television display, where said plurality of social network thumbnails represent social network videos that are retrieved in the plurality of social media posts or which are posted or linked to a social network post;

select and retrieving an advertisement from an advertisement server via the Internet;

represent the advertisement as a thumbnail representation;

display the advertisement thumbnail representation within the array of thumbnails on the television display;

where displaying the advertisement thumbnail comprises displaying one advertisement thumbnail for AD VALUE social network thumbnails, where AD VALUE is an integer that changes randomly or pseudo-randomly within a predefined range over time; and receive an instruction selecting of one of the thumbnails to navigate to and responsive thereto displaying either one of the social network videos or the advertisement.

26. The television receiver device according to claim 25, where the advertisement comprises one of a video and a link to a web site.

27. The television receiver device according to claim 25, where the programmed processor is further programmed to create the advertisement thumbnail representation.

28. The television receiver device according to claim 25, where displaying the video or the advertisement comprises launching a browser module or a video player module responsive to receipt of the instruction selecting one of the thumbnails.

29. The television receiver device according to claim 25, where the advertisement is selected based on a user profile.

30. The television receiver device according to claim 25, where displaying the social network video further comprises displaying an associated social media post to which the social media video was linked and displaying a social network identifier.

31. A device adapted to display content on a display, comprising:

a video display;

a television receiver device configured to display a television program on the video display;

a memory storing a social media registry;

one or more programmed processors programmed to:

retrieve a plurality of social network posts from one or more social networks identified by storage in the television receiver device's social media registry;

display a plurality of social network thumbnails as an array of thumbnails overlaying a television program displayed on the video display, where said plurality of social network thumbnails represent social network videos that are retrieved in the plurality of social media posts or which are posted or linked to a social network post;

using use an advertisement retrieval program to select an advertisement from an advertisement server via the Internet, where the advertisement comprises one of a video and a link to a web site;

where the processor is programmed to select the advertisement and retrieve the advertisement from an advertisement server via the Internet based upon a user profile stored at the television receiver device;

create the advertisement thumbnail representation to represent the advertisement;

display the advertisement thumbnail representation within the array of thumbnails on the display, where displaying the advertisement thumbnail comprises displaying one advertisement thumbnail for every AD VALUE social network thumbnails, where AD VALUE is an integer that changes randomly or pseudo-randomly within a predefined range; and receive an instruction selecting of one of the thumbnails to navigate to;

responsive thereto display either one of the social network videos or the advertisement, launching a browser module and displaying the one of the social network videos further comprises displaying an associated social media post to which the social media video was linked overlaying a portion of the television program and displaying a social network identifier.

* * * * *